United States Patent
Hsieh

(10) Patent No.: US 6,438,195 B1
(45) Date of Patent: Aug. 20, 2002

(54) METHODS AND APPARATUS FOR COMPENSATING FOR VIEW ALIASING ARTIFACTS

(75) Inventor: Jiang Hsieh, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 76 days.

(21) Appl. No.: 09/771,198

(22) Filed: Jan. 26, 2001

(51) Int. Cl.$^7$ ................................................ A61B 6/03
(52) U.S. Cl. .................. 378/4; 378/8; 378/62; 378/901
(58) Field of Search ................ 378/4, 8, 15, 62, 378/901

(56) References Cited

U.S. PATENT DOCUMENTS

| | | | |
|---|---|---|---|
| 4,503,461 A | * 3/1985 | Nishimura | 358/463 |
| 5,774,357 A | 6/1998 | Hoffberg et al. | |
| 5,875,108 A | 2/1999 | Hoffberg et al. | |
| 5,926,521 A | 7/1999 | Tam | |
| 5,946,371 A | * 8/1999 | Lai | 378/15 |
| 6,014,419 A | 1/2000 | Hu | |
| 6,035,012 A | 3/2000 | Hsieh | |
| 6,061,419 A | 5/2000 | Hsieh et al. | |
| 6,078,638 A | 6/2000 | Sauer et al. | |
| 6,101,234 A | 8/2000 | Ali et al. | |
| 6,134,292 A | 10/2000 | Hsieh | |
| 6,201,849 B1 | 3/2001 | Lai | |
| 6,215,841 B1 | 4/2001 | Hsieh | |
| 6,256,365 B1 | 7/2001 | Lai | |
| 6,256,366 B1 | 7/2001 | Lai | |
| 6,256,368 B1 | 7/2001 | Hsieh et al. | |
| 6,263,040 B1 | 7/2001 | Hsieh | |
| 6,266,388 B1 | 7/2001 | Hsieh | |

* cited by examiner

*Primary Examiner*—David V. Bruce
(74) *Attorney, Agent, or Firm*—Carl B. Horton, Esq.; Armstrong Teasdale LLP

(57) ABSTRACT

Methods and apparatus to reduce and eliminate aliasing artifacts generated as a result of performing high speed scans are described. In one embodiment, the method includes the steps of applying a weighting function to the projection data, and determining an aliasing index from the weighted data. The aliasing index per view is utilized to determine the region and the amount of synthesized views required to reduce the aliasing artifact.

39 Claims, 2 Drawing Sheets

METHODS AND APPARATUS FOR COMPENSATING FOR VIEW ALIASING ARTIFACTS

BACKGROUND OF THE INVENTION

This invention relates generally to methods and apparatus for CT imaging and other radiation imaging systems, and more particularly to reducing aliasing artifacts.

In at least some computed tomography (CT) imaging system configurations, an x-ray source projects a fan-shaped beam which is collimated to lie within an X-Y plane of a Cartesian coordinate system and generally referred to as an "imaging plane". The x-ray beam passes through an object being imaged, such as a patient. The beam, after being attenuated by the object, impinges upon an array of radiation detectors. The intensity of the attenuated beam radiation received at a detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged, so the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent to the scintillator.

The scan speed of CT systems has nearly quadrupled in recent years. Increasing scan speed results in improved temporal resolution and reducing the amount of time required to perform each scan. Therefore, patient scans are completed more quickly and more scans can be performed.

Increased scan speeds, however, can result in image artifacts. For example, to avoid view aliasing artifacts, the data-sampling rate needs to be increased proportionally with the scan speed. For a 1.0 s scan speed, i.e., 1 second per revolution, a data acquisition system (DAS) should sample signals from the detector at 984 Hz to avoid aliasing artifacts. For a 0.8 s scan speed, the DAS sample rate should be 1230 Hz to avoid aliasing artifacts. When the scan speed reaches 0.5 s per revolution, the DAS sampling rate should be 1968 Hz to avoid aliasing artifacts. Conventional DAS, however, sample at a rate of 1408 Hz.

Adaptive view interpolation can be utilized to eliminate or reduce aliasing artifacts. Although adaptive view interpolation is effective in most clinical conditions, the interpolation is performed on every scan regardless of the object being scanned. Since the interpolation is performed on all scans, the relative contribution of the interpolated views is kept to a moderate level to avoid significant degradation of spatial resolution. As a result, some residual aliasing artifacts may be present. Also, although aliasing is predominately in a horizontal direction, aliasing may occur in other directions. For example, if a patient is scanned lying on his or her side, aliasing may occur in a vertical direction.

BRIEF SUMMARY OF THE INVENTION

Methods and apparatus for reducing aliasing artifacts generated as a result of performing high speed scans are described. In an exemplary embodiment of the method, view aliasing artifacts are reduced by generating an aliasing index for each view, and the aliasing index is used to determine the region and the amount of synthesized views required to reduce the aliasing artifact. The aliasing index is generated from the projection data.

The above described method for reducing, if not eliminating, aliasing artifacts facilitates performing high speed scans even if the DAS sample rate is not fast enough to avoid such artifacts. Further, implementing the method does not require that additional hardware be used or replaced.

DETAILED DESCRIPTION OF THE INVENTION

Figure 1:
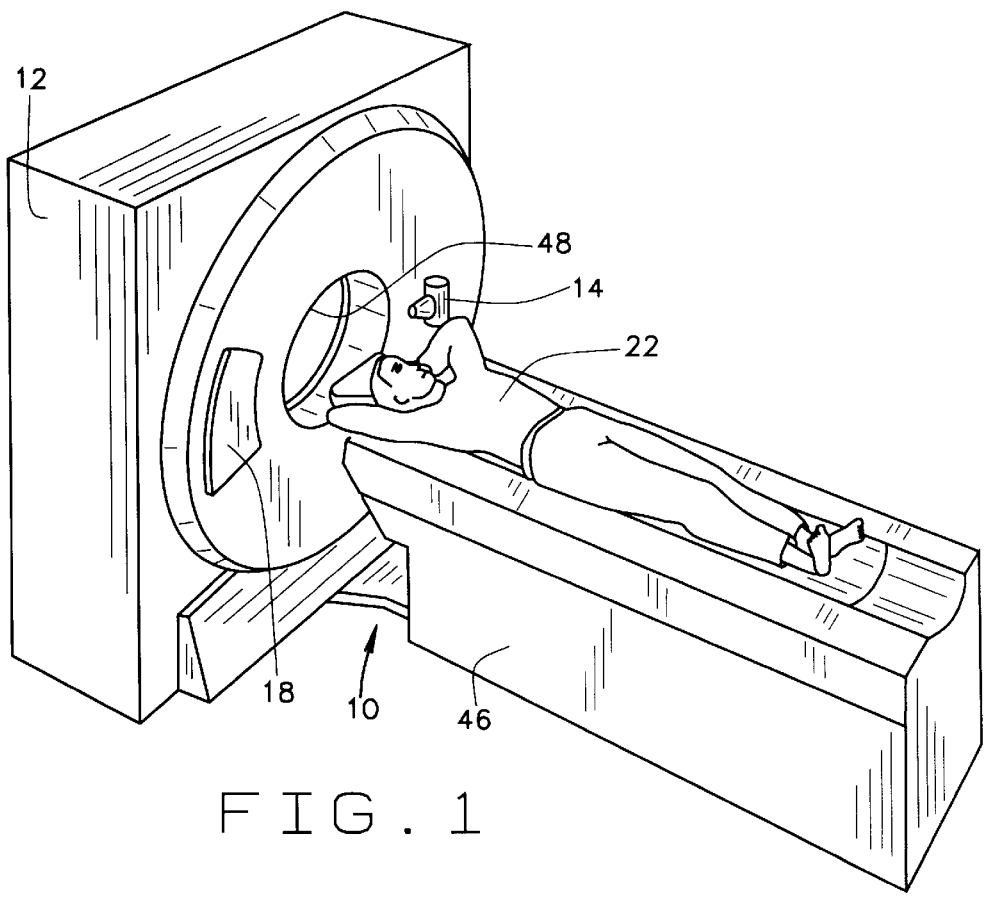
FIG. 1 is a pictorial view of a CT imaging system.
Figure 2:
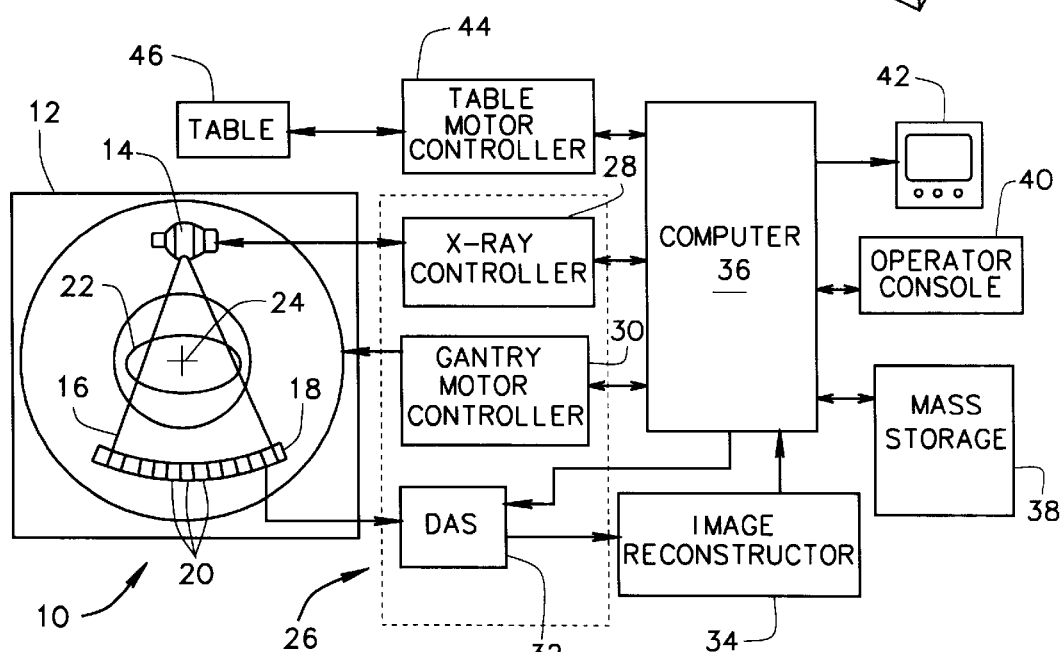
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
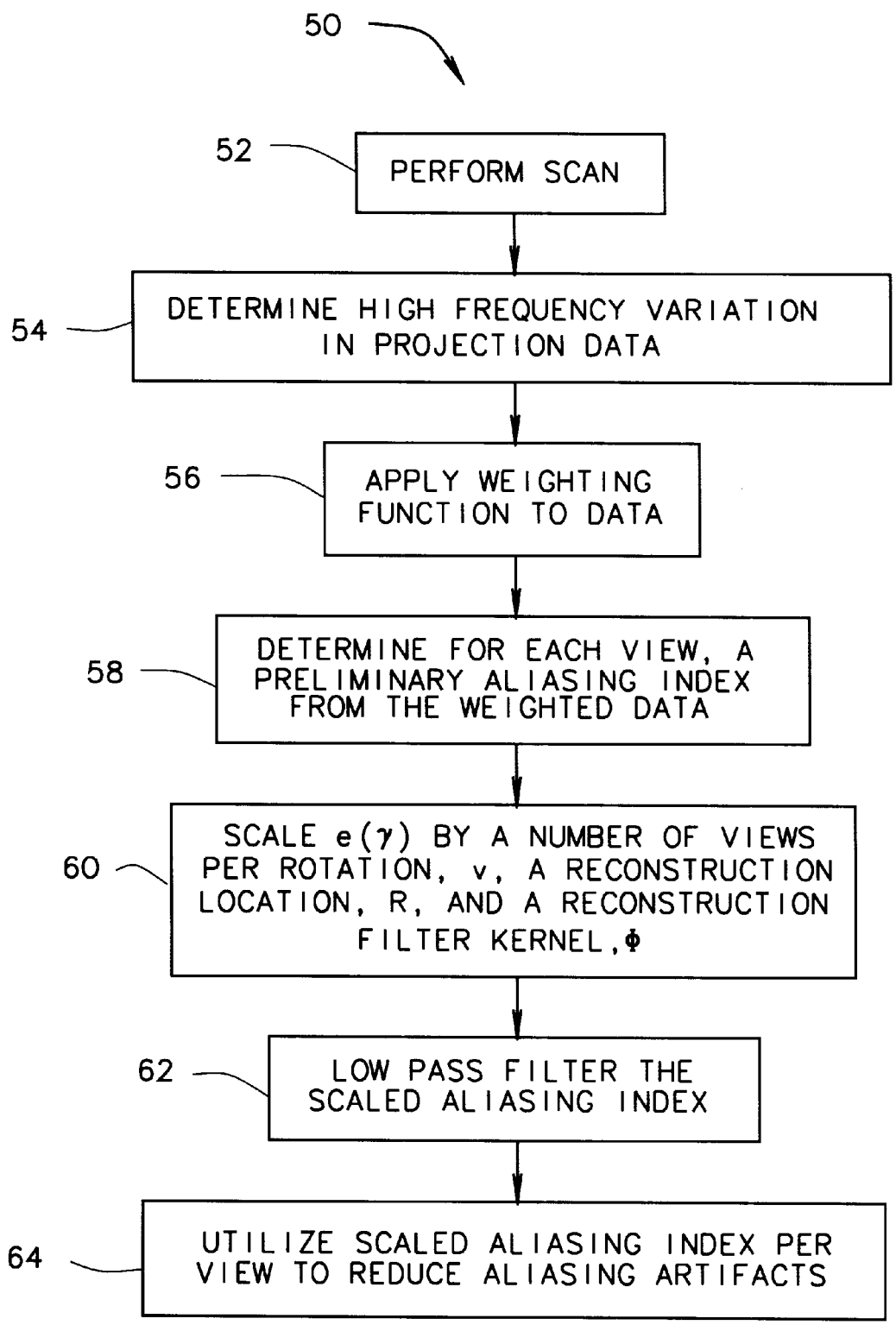
FIG. 3 is a flow chart illustrating the steps executed by the CT system to compensate for view aliasing artifacts.

FIG. 3 is a flow chart 50 illustrating the steps executed by CT system 10 (shown in FIG. 1) to compensate for view aliasing artifacts. The method illustrated in FIG. 3 can be practiced by DAS 32 (shown in FIG. 2), image reconstructor 34 (shown in FIG. 2), or computer 36 (shown in FIG. 2). Generally, a processor in at least one of DAS 32, reconstructor 34, and computer 36 is programmed to execute the process steps described below. Of course, the method is not limited to practice in CT system 10 and can be utilized in connection with many other types and variations of imaging systems.

Referring specifically to FIG. 3, and when performing a scan 52, a set of raw scan data is acquired. The raw scan data is pre-processed to generate a set of projection data $p(\gamma,\beta)$. As explained above, view aliasing occurs when scanned object 22 changes along a plurality of view directions, where each view is determined by a projection angle, $\beta$. Therefore, after collecting the projection data, $p(\gamma,\beta)$, a high frequency variation for each view in the projection data 54 is determined according to the relationship:

$$\xi(\gamma,\beta) = \frac{\partial p(\gamma,\beta)}{\partial \beta},$$

where $p(\gamma,\beta)$ is the measured projection after proper pre-processing, $\gamma$ is the fan angle, $\beta$ is the projection angle, and $\xi(\gamma,\beta)$ represents the high-frequency variation of the projection.

Variations in views collected during a scan can be caused, for example, by patient table 46. Patient table 46 is formed with multiple flat segments, and projection data for the multiple segments changes from view to view. To avoid view variation, a weighting function 56 is applied to high-frequency variation estimate, $\xi(\gamma,\beta)$, to exclude the influence of table 46.

Although many weighting functions can be used, in one embodiment, the boundaries of the weight function, $\gamma_h(\beta)$ and $\gamma_l(\beta)$, are determined based on the location at which the projection intensity exceeds a fraction of the peak value for view $\beta$. Weighting function, $w(\gamma,\beta)$, is zero outside the boundaries and reaches unity at the center region. The transition from zero to unity is a smooth function. For example, an exemplary weighting function, $w(\gamma,\beta)$, can be described by the following relationship:

$$w(\gamma,\beta) = \begin{cases} \frac{\gamma - \gamma_l(\beta)}{\eta} & \gamma_l(\beta) \leq \gamma < \gamma_l(\beta) + \eta \\ 1 & \gamma_l(\beta) \leq \gamma < \gamma_h(\beta) \\ \frac{\gamma_h(\beta) - \gamma}{\eta} & \gamma_h(\beta) - \eta < \gamma \leq \gamma_h(\beta) \\ 0 & \text{otherwise,} \end{cases}$$

q otherwise
where $\eta$ represents the width of a transition region.

In addition to applying weighting function 56, because aliasing artifacts come from the highest frequency contents in the projection, for each view, the maximum value of the frequency content is determined according to the following relationship:

$$\epsilon(\beta) = f[|\xi(\gamma,\beta)w(\gamma,\beta)|],$$

where $f$ is a function representing a maximum frequency value. In another embodiment, $f$ is a function representing the average of a plurality of top N maximum values to reduce the influence of noise. A preliminary aliasing index, $\epsilon(\beta)$, 58 is then determined based on the maximum frequency contents from the weighted data. The amount of aliasing artifacts present in a reconstructed image depends on the frequency contents of the projection, and also on a projection view sampling rate, a reconstruction field of view, and a reconstruction filter kernel. The lower the number of views collected during a $2\upsilon$ rotation of gantry 12 (shown in FIGS. 1 and 2), the more likely is the occurrence of the presence of an aliasing artifact. Similarly, for the reconstruction region that is further away from an isocenter, the likelihood of aliasing artifacts increases. The reconstruction filter kernel will influence the aliasing artifact in a similar manner, with the higher resolution kernels producing more aliasing. Therefore, the preliminary index, $\epsilon(\beta)$, needs to be scaled 60 by a number of views per rotation, $v$; a reconstruction location, R; and a reconstruction filter kernel, $\phi$, according to the relationship:

$$\chi(\beta) = g(v^{-1}, R, \phi)\epsilon(\beta)$$

To further reduce the influence of noise, the scaled aliasing index is passed through a low pass filter 62.

The scaled and filtered aliasing index, $\chi(\beta)$, is then utilized to reduce aliasing artifacts 64 by determining a region and a number of synthesized views required to minimize potential aliasing artifact. The higher the value of the scaled aliasing index, $\chi(\beta)$, the higher the likelihood of the occurrence of aliasing artifacts. Therefore, a greater number of synthesized views should be generated in regions where the scaled aliasing index is high as compared to regions where the scaled aliasing index is low. The synthesized views can be generated using any one of many known techniques, such as interpolation.

In an alternative embodiment, to minimize aliasing artifact, more contribution, i.e., a higher weight, is placed on the synthesized views if the scaled aliasing index is high in a particular region. In a further alternative embodiment, the aliasing index may be used to predict sampling rates as a function of the projection angle, when DAS 32 (shown in FIG. 2) sampling rate is dynamically adjusted. For instance, the value of the aliasing index increases as DAS 32 sampling rate increases, therefore, a particular sampling rate corresponds to a particular range of aliasing indices.

The above described method for reducing, if not eliminating, aliasing artifacts facilitates performing high speed scans even if the DAS sample rate is not fast enough to avoid such artifacts. Further, implementing the method does not require that additional hardware be used or replaced.

While the invention has been described in terms of various specific embodiments, those skilled in the art will recognize that the invention can be practiced with modification within the spirit and scope of the claims.

What is claimed is:

1. A method to compensate for view aliasing artifacts in a computed tomography imaging system including an x-ray source for radiating an x-ray beam along an imaging plane toward a detector array including a plurality of detector cells, said method comprising the steps of:

determining a high frequency variation in projection data collected during a scan;

applying a weighting function to the high frequency variation in projection data; and determining an aliasing index from the weighted data.

2. A method in accordance with claim 1 wherein said step of determining a high frequency variation comprises the step of pre-processing raw data collected during a scan to generate projection data, $p(\gamma,\beta)$, where $\gamma$ is a fan angle, $\beta$ is a projection angle.

3. A method in accordance with claim 2 wherein said step of determining a high frequency variation further comprises the step of determining the high frequency variation according to the relationship:

$$\xi(\gamma,\beta) = \frac{\partial p(\gamma,\beta)}{\partial \beta},$$

where $\gamma$ is a fan angle, $\beta$ is a projection angle, $\xi(\gamma,\beta)$ represents the high-frequency variation of the projection.

4. A method in accordance with claim 1 wherein said step of applying a weighting function comprises the step of applying a weighting function, $w(\gamma,\beta)$, to each high frequency variation of the projection, $\xi(\gamma,\beta)$, according to the relationship $\xi(\gamma,\beta)*w(\gamma,\beta)$, where $$w(\gamma,\beta) = \begin{cases} \frac{\gamma - \gamma_l(\beta)}{\eta} & \gamma_l(\beta) \leq \gamma < \gamma_l(\beta) + \eta \\ 1 & \gamma_l(\beta) \leq \gamma < \gamma_h(\beta) \\ \frac{\gamma_h(\beta) - \gamma}{\eta} & \gamma_h(\beta) - \eta < \gamma \leq \gamma_h(\beta) \\ 0 & \text{otherwise.} \end{cases}$$

5. A method in accordance with claim 1 further comprising the step of determining a maximum value of frequency for each view, $\beta$, according to the relationship:

$$\epsilon(\beta) = f[|\xi(\gamma,\beta)w(\gamma,\beta)|],$$

where $\xi(\gamma,\beta)$ is a high frequency variation of the projection, $w(\gamma,\beta)$ is a weighting function, and $f$ is a function representing a maximum frequency value.

6. A method in accordance with claim 1 wherein said step of determining an aliasing index comprises the step of determining for each view, $\beta$, a preliminary aliasing index, $\epsilon(\beta)$, from the weighted data.

7. A method in accordance with claim 6 wherein said step of determining an aliasing index further comprises the step of scaling the preliminary aliasing index by a number of views per rotation, $v$, a reconstruction location, $R$, and a reconstruction filter kernel, $\phi$.

8. A method in accordance with claim 7 wherein said step of determining an aliasing index further comprises the step of applying a low pass filter to the scaled preliminary aliasing index.

9. A method in accordance with claim 1 further comprising the step of utilizing the aliasing index to determine a region and an amount of synthesized views required to reduce aliasing artifacts.

10. A method in accordance with claim 1 further comprising the step of utilizing the aliasing index to control an amount of contribution of synthesized view weighting to minimize potential aliasing artifact.

11. A method in accordance with claim 1 further comprising the step of utilizing the aliasing index to predict sampling rates as a function of a projection angle, when a DAS sampling rate is dynamically adjusted.

12. An imaging system comprising a computer, a gantry having a detector array, an x-ray source for radiating an x-ray beam along an imaging plane toward the detector array including a plurality of detector cells, the computer coupled to the x-ray source and the gantry, said imaging system configured to:

determine a high frequency variation in data collected during a scan;

apply a weighting function to said high frequency variation in projection data; and determine an aliasing index from said weighted data.

13. An imaging system in accordance with claim 12 wherein said imaging system further configured to preprocess raw data collected during a scan to generate projection data, $p(\gamma,\beta)$, where $\gamma$ is a fan angle, $\beta$ is a projection angle.

14. An imaging system according to claim 13 wherein said imaging system further configured to determine a high frequency variation in said projection data according to the relationship:

$$\xi(\gamma,\beta) = \frac{\partial p(\gamma,\beta)}{\partial \beta},$$

where $\gamma$ is a fan angle, $\beta$ is a projection angle, and $\xi(\gamma,\beta)$ represents said high frequency variation of the projection.

15. An imaging system according to claim 12 wherein said imaging system further configured to apply a weighting function, $w(\gamma,\beta)$, to each high frequency variation of the projection, $\xi(\gamma,\beta)$, according to the relationship $\xi(\gamma,\beta)*w(\gamma,\beta)$, where $$w(\gamma,\beta) = \begin{cases} \frac{\gamma - \gamma_l(\beta)}{\eta} & \gamma_l(\beta) \leq \gamma < \gamma_l(\beta) + \eta \\ 1 & \gamma_l(\beta) \leq \gamma < \gamma_h(\beta) \\ \frac{\gamma_h(\beta) - \gamma}{\eta} & \gamma_h(\beta) - \eta < \gamma \leq \gamma_h(\beta) \\ 0 & \text{otherwise.} \end{cases}$$

16. An imaging system according to claim 12 wherein said imaging system further configured to determine a maximum value of frequency for each view, $\beta$, according to the relationship:

$$\epsilon(\beta) = f[|\xi(\gamma,\beta)w(\gamma,\beta)|],$$

where $\xi(\gamma,\beta)$ is a high frequency variation of the projection, $w(\gamma,\beta)$ is a weighting function, and $f$ is a function representing a maximum frequency value.

17. An imaging system according to claim 12 wherein said imaging system further configured to determine for each view, $\beta$, a preliminary aliasing index, $\epsilon(\beta)$, from said weighted data.

18. An imaging system according to claim 17 wherein said imaging system further configured to scale said preliminary aliasing index by a number of views per rotation, $v$, a reconstruction location, $R$, and a reconstruction filter kernel, $\phi$.

19. An imaging system according to claim 18 wherein said imaging system further configured to apply a low pass filter to said scaled preliminary aliasing index.

20. An imaging system according to claim 12 wherein said aliasing index is utilized to determine a region and an amount of synthesized views required to reduce aliasing artifacts.

21. An imaging system according to claim 12 wherein said aliasing index is utilized to control an amount of contribution of synthesized view weighting to minimize potential aliasing artifact.

22. An imaging system according to claim 12 wherein said aliasing index is utilized to predict sampling rates as a function of a projection angle, when a DAS sampling rate is dynamically adjusted.

23. A processor programmed to compensate for view aliasing artifacts in a computed tomography imaging system, said processor configured to:

acquire projection data;

apply a weighting function to a high frequency variation in said projection data;

determine an aliasing index from said weighted data; and reduce aliasing artifacts using said aliasing index per view.

24. A processor in accordance with claim 23 wherein said processor further configured to pre-process raw data collected during a scan to generate projection data p(γ,β), where γ is a fan angle, β is a projection angle.

25. A processor in accordance with claim 24 wherein said processor further configured to determine a high frequency variation of a projection according to the relationship:

$$\xi(\gamma, \beta) = \frac{\partial p(\gamma, \beta)}{\partial \beta},$$

where γ is a fan angle, β is a projection angle, and ξ(γ,β) represents said high frequency variation of the projection.

26. A processor in accordance with claim 23 wherein said processor further configured to apply a weighting function, w(γ,β), to each high frequency variation of the projection, ξ(γ,β), according to the relationship ξ(γ,β)*w(γ,β), $$\text{where } w(\gamma, \beta) = \begin{cases} \frac{\gamma - \gamma_l(\beta)}{\eta} & \gamma_l(\beta) \leq \gamma < \gamma_l(\beta) + \eta \\ 1 & \gamma_l(\beta) \leq \gamma < \gamma_h(\beta) \\ \frac{\gamma_h(\beta) - \gamma}{\eta} & \gamma_h(\beta) - \eta < \gamma \leq \gamma_h(\beta) \\ 0 & \text{otherwise.} \end{cases}$$

27. A processor in accordance with claim 23 wherein said processor configured to determine a maximum value of frequency for each view, β, according to the relationship:

$$\epsilon(\beta) = f[|\xi(\gamma,\beta)w(\gamma,\beta)|],$$

where ξ(γ,β) is a high frequency variation of the projection, w(γ,β) is a weighting function, and ƒ is a function representing a maximum frequency value.

28. A processor in accordance with claim 23 wherein said processor configured to determine for each view, β, a preliminary aliasing index, ε(β), from said weighted data.

29. A processor in accordance with claim 28 wherein said processor configured to scale said preliminary aliasing index by at least one of a number of views per rotation, v, a reconstruction location, R, and a reconstruction filter kernel, φ.

30. A processor in accordance with claim 29 wherein said processor configured to apply a low pass filter to said scaled preliminary aliasing index.

31. A processor in accordance with claim 23 wherein said aliasing index is utilized to determine a region and an amount of synthesized views required to reduce aliasing artifacts.

32. A processor in accordance with claim 23 wherein said aliasing index is utilized to control an amount of contribution of synthesized view weighting to minimize potential aliasing artifact.

33. A processor in accordance with claim 23 wherein said aliasing index is utilized to predict sampling rates as a function of a projection angle, when a DAS sampling rate is dynamically adjusted.

34. A computer-readable medium in an imaging system, said computer-readable medium comprising:

a function to determine a high frequency variation in projection data;

a weighting function applied to said high frequency variation of the projection data; and a function to determine a maximum frequency value for each view of projection data.

35. A computer-readable medium according to claim 34 wherein said projection data comprises pre-process raw data collected during a scan configured to generate projection data, high frequency function uses projection data p(γ,β), where γ is a fan angle, β, is a projection angle.

36. A computer-readable medium according to claim 34 wherein said function to determine high frequency variation of projection data comprises the relationship:

$$\xi(\gamma, \beta) = \frac{\partial p(\gamma, \beta)}{\partial \beta},$$

where γ is a fan angle, β is a projection angle, and ξ(γ,β) represents said high frequency variation of the projection.

37. A computer-readable medium according to claim 34 wherein said weighting function comprises:

$$w(\gamma, \beta) = \begin{cases} \frac{\gamma - \gamma_l(\beta)}{\eta} & \gamma_l(\beta) \leq \gamma < \gamma_l(\beta) + \eta \\ 1 & \gamma_l(\beta) \leq \gamma < \gamma_h(\beta) \\ \frac{\gamma_h(\beta) - \gamma}{\eta} & \gamma_h(\beta) - \eta < \gamma \leq \gamma_h(\beta) \\ 0 & \text{otherwise.} \end{cases}$$

38. A computer-readable medium according to claim 37 wherein said weighting function, w(γ,β), is configured to be applied to each high frequency variation of the projection, ξ(γ,β), according to the relationship ξ(γ,β)*w(γ,β).

39. A computer-readable medium according to claim 34 wherein said function to determine a maximum frequency value comprises:

$$\epsilon(\beta) = f[|\xi(\gamma,\beta)w(\gamma,\beta)|],$$

where ξ(γ,β) is a high frequency variation of the projection, w(γ,β) is a weighting function, and ƒ is a function representing a maximum frequency value.

* * * * *

UNITED STATES PATENT AND TRADEMARK OFFICE
CERTIFICATE OF CORRECTION

PATENT NO. : 6,438,195 B1
DATED : August 20, 2002
INVENTOR(S) : Jiang Hsieh

It is certified that error appears in the above-identified patent and that said Letters Patent is hereby corrected as shown below:

Column 7,
Line 37, delete "$\varepsilon(\beta) = f[|\xi(\gamma,\beta)w9\gamma,\beta)|]$" and insert therefor -- $\varepsilon(\beta) = f[|\xi(\gamma,\beta)w(\gamma,\beta)|]$ --.

Signed and Sealed this

Twenty-fifth Day of May, 2004

JON W. DUDAS
*Acting Director of the United States Patent and Trademark Office*